3,290,678
MEANS FOR CORRECTING THE LOCAL OSCILLATOR FREQUENCY IN A RADAR SYSTEM
Nils Rune Carlsson, Bandhagen, Sweden, assignor to North American Philips Company, Inc., New York, N.Y., a corporation of Delaware
Filed Feb. 5, 1965, Ser. No. 430,556
6 Claims. (Cl. 343—17.1)

The present invention relates to a system for correcting the local oscillator frequency in radar equipment transmitting radar pulses of varying frequency. The system comprises a tunable transmitter tube with means for continuously varying the tuning or natural frequency of the said tube, the frequency of the transmitted radar pulses being dependent upon the said natural frequency. The system also comprises means for triggering the transmitter tube, and a receiver in which the received echo pulses are mixed with the energy from a local oscillator having voltage sensitive frequency regulating means controlled by a control voltage representing the tuning frequency of the transmitting tube at least during the triggering instant. Means are also provided for maintaining the control voltage substantially constant during the echo time interval at the value prevailing at the triggering moment, for example such that the oscillator frequency resulting from the control voltage is equal to the natural frequency of the transmitting tube in unexcited condition at the triggering moment. If the local oscillator frequency is locked during the echo time interval to the frequency value prevailing at the triggering moment, the intermediate frequency in the receiver will be equal to the difference between the natural frequency of the transmitting tube in unexcited condition (=cold frequency) and the natural frequency in excited condition (=warm frequency). This frequency difference, however, varies between different portions of the tuning range of the tube, and the mean value of the frequency difference over the tuning range varies with temperature, age, etc. The mean value can also be different for different tubes of the same kind. For the purpose of compensating for these variations in order to achieve a substantially constant invariable intermediate frequency in the receiver, it has previously been proposed to measure the difference between the locked oscillator frequency and the frequency of the radar pulse at the transmission moment, and by means of this measurement make a correction of the local oscillator frequency immediately after the transmission of the radar pulse to a value giving substantially the required intermediate frequency at the reception of the echo pulse. However, the variation in the mean difference between the cold and warm frequencies of the transmitting tube will resutl in this frequency correction or pulse-to-pulse correction necessarily being relatively great, thus decreasing the accuracy with which it can be effected. The decrease of accuracy with increased frequency correction is dependent, for example, upon nonlinearity in the frequency regulation characteristic of the local oscillator.

The object of the invention is to provide means enabling more accurate control of the local oscillator frequency in a radar equipment of the above-described kind, as compared to known equipment, and by this means make possible to use a receiver with a smaller band width.

According to the invention, radar equipment of the above-described kind is provided with means for determining the difference between the frequency of the transmitted radar pulse and the oscillator frequency at the moment of transmission of the radar pulse, means for producing a pulse of a voltage representing the deviation of the said difference from a predetermined fixed intermediate frequency, and means for maintaining the deviation pulse until the end of the echo time interval and eliminating the pulse after the end of the echo time interval. The deviation pulse is applied to the voltage sensitive frequency regulating means so as to correct the frequency of the local oscillator to a value giving substantially the predetermined intermediate frequency in combination with the frequency of the radar pulse. The means for producing deviation pulses is also connected to a device compirsing a filter with low pass function and having a relatively great time constant, for producing an output voltage representing the mean value of a number of foregoing deviation pulses. This output voltage is applied to the voltage sensitive frequency regulating means for preadjusting the frequency of the local oscillator, so that the mean value is regulated substantially to zero.

By preadjusting the local oscillator frequency before the transmission moment so that the mean value of the voltage pulses used for producing the pulse-to-pulse correction of the local oscillator is equal to zero, the correction after the transmission moment will be minimum and can therefore be effected with higher accuracy than hitherto possible.

The invention will now be explained more fully with reference to the accompanying drawings in which.

Figure 1:
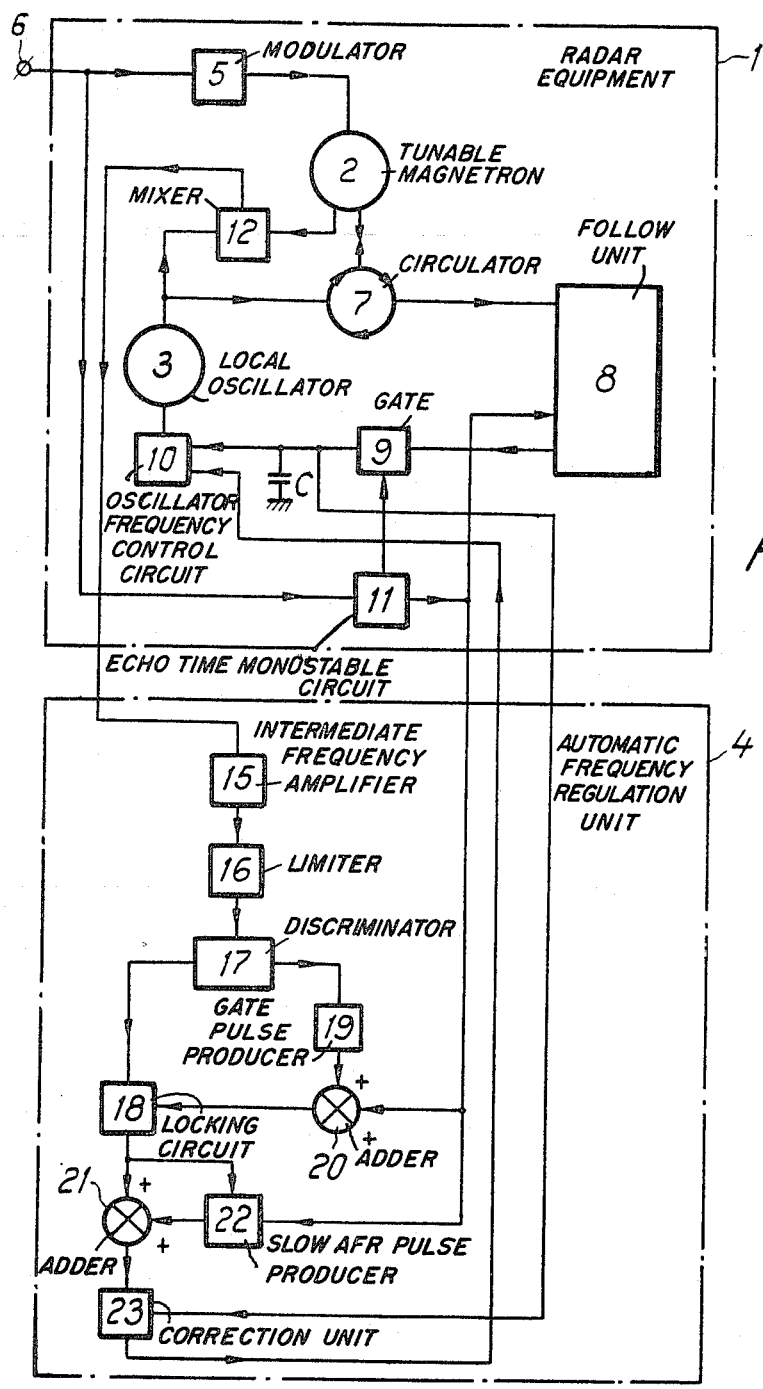
FIG. 1 is a block diagram of a device according to the invention for automatic frequency regulation of the local oscillator in a radar equipment operating with from pulse-to-pulse varying frequency.

The radar equipment shown in simplified form in FIG. 1 and designated with the reference numeral 1, comprises a transmitting tube such as a periodically tunable magnetron 2, and a local oscillator 3. According to the invention, the radar equipment co-operates with an AFR unit 4 (AFR=automatic frequency regulation) adapted to automatically regulate and lock the local oscillator frequency, in response to the triggering and transmission of a radar pulse, to such a value that the received echo pulses of varying frequency in combination with the local oscillator frequency will give a predetermined substantially invariable intermediate frequency in the receiver. The magnetron 2, for example of the kind described in the United States Patent No. 2,931,943, co-operates with a modulator 5. Due to the reception of a triggering pulse at an input terminal or sync input 6, the modulator 5 delivers its energy to the magnetron and causes the magnetron to produce a radar pulse of required length. The radar pulse is transmitted in a way known per se. The frequency of the radar pulses is determined by the tuning frequency of the magnetron in the triggering instant, it being assumed that the triggering pulses occur at such time that the frequency of the transmitted radar pulses will vary at random from pulse to pulse. Upon the reception of the echo pulses caused by the radar pulses, the echo pulses are mixed in a way known per se with the energy from the local oscillator 3 for producing an intermediate frequency signal.

In the radar equipment chosen as an example the local oscillator is slaved to the magnetron before the triggering moment the frequency of the local oscillator is thus controlled so that it corresponds at each instant to the tuning frequency of the magnetron in unexcited condition (=cold frequency). This is achieved by means of a closed loop regulation circuit consisting of a circulator 7 for applying output energy of the local oscillator to the tuned output circuit of the magnetron 2 and for applying the local oscillator energy reflected from the output circuit to a follow unit 8. The follow unit 8 delivers a follow control voltage through a gate 9 to a control circuit 10 for regulating the local oscillator to frequency equivalence with the tuning frequency of the magnetron. The schematically shown follow unit 8 may for example be of the kind described in the United States Patent No. 3,249,937, and comprises a modulation oscillator for frequency modulating the oscillator 3. The frequency modulation is converted by the reflection in the tuned cavity of the magnetron to an amplitude modulation, the amplitude and phase of which indicates the position of the middle frequency of the local oscillator in relation to the tuning frequency of the magnetron and which can be used for controlling the local oscillator. The gate 9 is controlled by an echo time monostable circuit 11, which is switched by means of a triggering pulse appearing at the input 6 for closing the gate at the appearance of said pulse. A capacitor C is connected to a connection line between gate 9 and the control unit 10 for holding the follow control voltage constant during the echo time interval at the value prevailing in the triggering instant. The frequency modulation of the local oscillator is also stopped at the triggering moment. The echo time monostable circuit and returns to its initial position after a time interval equal to the maximum echo time interval for the radar equipment.

If no further means were provided the intermediate frequency would be substantially equal to the difference between the tuning of natural frequency of the magnetron in unexcited condition (=cold frequency) and the natural frequency in excited condition (=warm frequency). This difference between the cold and warm frequencies is, however, different at different portions of the tuning curve and varies furthermore with age, temperature and can be different for different magnetrons. In order to compensate for these deviations in the difference frequency, a small portion of the energy of the radar pulse is fed to a mixer 12. The mixer receives its second input signal from the local oscillator, and delivers its output signal to the automatic frequency regulating unit for producing the required correction of the local oscillator frequency.

Figure 2:
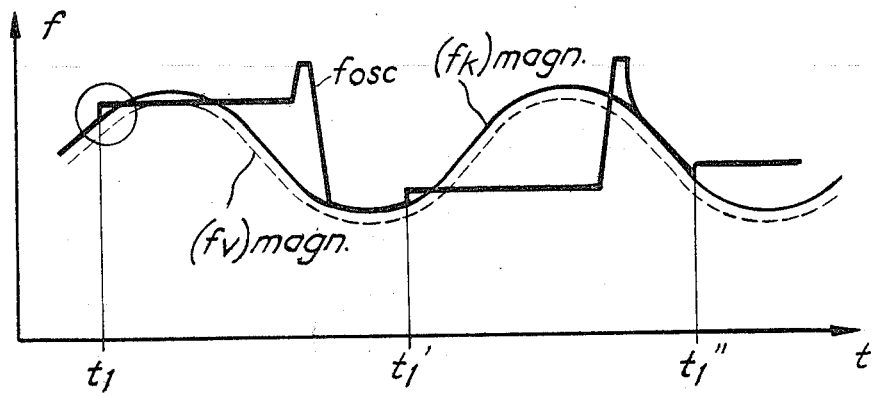
FIGS. 2 and 3 are diagrams illustrating the variation of frequency with time in the device according to FIG. 1, for illustrating the fundamental principles of the invention.

The compensation according to the invention is illustrated by means of the frequency curves shown in FIG. 2, wherein curve $(f_k)_{magn}$ relates to the cold frequency of the magnetron, $(f_v)_{magn}$ relates to the warm frequency and $f_{osc}$ relates to the local oscillator frequency. The moments of occurrence of triggering pulse are designated $t_1$, and $t_1'$, $t_1''$. As shown, the oscilator frequency and the cold frequency of the magnetron are equal until the triggering moment. At this moment the oscillator frequency is corrected in a way described more clearly in the following paragraphs and is then maintained constant during the echo time interval. After the end of the echo time interval the oscillator makes a rapid frequency sweep to a value above the tuning range and immediately afterwards a rapid frequency sweep across the tuning range until coincidence with the cold frequency of the magnetron occurs, when the above-described cycle is repeated. The means for producing the frequency sweeps and the restoring of the following operation does not form any part of the invention and are therefore not described in detail.

Figure 3:
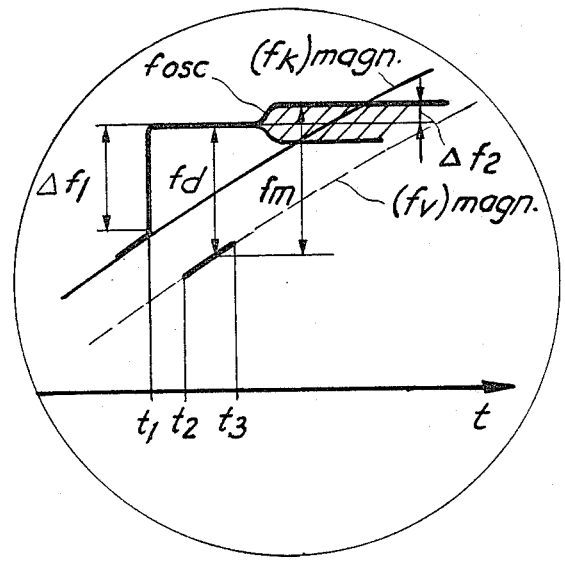

FIG. 3 shows an enlarged portion of the diagram according to FIG. 2 for illustrating the principle of frequency correction according to the invention. FIG. 3 shows that the frequency correction is made in two steps, one step $\Delta f_1$ occuring at the triggering moment $t_1$ and a smaller step $\Delta f_2$ after the transmission of the radar pulse. The transmission of the radar pulse occurs between the moments $t_2$ and $t_3$. The difference frequency measured at the transmission moment by the mixer 12 is designated $f_d$ in FIG. 3 and it is the deviation of this difference frequency from the required intermediate frequency that causes the following small correction of the local oscillator frequency so that the true intermediate frequency, in FIG. 3 designated $f_m$, will correspond as close as possible to the required value. The first frequency step $\Delta f_1$ which is relatively large can change its value only very slowly and is therefore called slow AFR, while the last frequency step $\Delta f_2$, which is small, can vary its value from pulse-to-pulse within the shadowed range and is therefore called rapid AFR or pulse-to-pulse AFR. The purpose of the first large frequency step is to make the second step coming after the transmission moment as small as possible. According to the invention, the first frequency correction step $\Delta f_1$ is therefore regulated such that the mean value of the frequency correction steps $\Delta f_2$ over a larger number of pulses, for example about 100, will be substantially equal to zero. In other words, the first frequency correction step $\Delta f_1$ is regulated so that the mean value of the measured frequency difference $f_d$ over a large number of pulses will be substantially equal to the required intermediate frequency.

The described frequency correction is achieved by means of the AFR unit 2 shown at the bottom of FIG. 1. The said unit consists of an intermediate frequency amplifier 15 receiving its input signal from the mixer 12 and delivering its amplified output voltage to an amplitude limiter 16. The limiter 16 delivers its output signal to a frequency discriminator 17 which in turn delivers a voltage pulse to a locking circuit 18, the said pulse indicating as to magnitude and direction the deviation of the difference frequency measured by the mixer 12 from the required intermediate frequency, for example 30 mc./s. The locking circuit 18 maintains a voltage at its output corresponding to the amplitude of the voltage pulse received from the discriminator 17 during the whole echo time interval. Due to the fact that the magnetron has an erroneous frequency during the first and last moments of a transmission (as shown in FIG. 3), the voltage pulse from the discriminator 17 will have an erroneous amplitude at the beginning and the end of the voltage pulse. The locking circuit must therefore be constructed so that it only takes into account the middle portion of the voltage pulse from the discriminator. This is achieved by feeding a single polarity constant amplitude voltage pulse from the discriminator 17 to a device 19, coinciding in time with the voltage pulse applied to locking circuit 18. This pulse suppresses those parts of the voltage pulse from the discriminator 17 which are situated at the beginning and the end of the same for producing a gate pulse coinciding in time with the center portion of the discriminator pulse. This gate pulse is then combined with the voltage from the echo time monostable circuit 11 in an addition device 20. The output signal of device 20 is applied to the locking circuit 18 in order to be used as a control signal in the same for producing a voltage at the output of the locking circuit corresponding to the amplitude of the center portion of the voltage pulse from the discriminator, and for maintaining this voltage during the echo time interval.

The output voltage from the locking circuit 18 comprises the voltage pulses for producing the previously mentioned rapid frequency regulation or pulse-to-pulse regulation. These pulses are hereinafter called the AFR pulses. The AFR pulses are applied to an adding device 21 and to a device 22. The output voltage from the echo time monostable circuit 11 is also applied to device 22. The device 22 produces at its output a voltage pulse coinciding in time with the echo time interval, this voltage pulse being applied to the device 21 for being combined with the AFR pulses from the locking circuit 18. The resulting voltage from device 21 is fed through a correction unit 23 to the control unit 10 of the local oscillator for producing the previously described frequency correction. The correction unit 23 compensates for the nonlinearity of the local oscillator 3 over the actual frequency band. For this purpose a control voltage from the follow circuit corresponding to the follow control voltage from the follow unit 8 is appaied to the correction unit 23. This voltage is a measure of the frequency of the local oscillator at the triggering moment, and by means of this control voltage the output voltage from the correction unit 23 is modified such that an input voltage of a certain amplitude to the correction unit always will give rise to the same frequency jump of the oscillator 3 independently of the frequency of the same.

The device 22 producing the said flow AFR corrections includes a filter having a long time constant. This filter determines the mean value of a great number of preceding AFR pulses from the locking circuit 18. This mean value is effective as the error voltage in a closed loop regulation circuit including the devices 22, 23, 10, 3, 12, 15, 16, 17, and 18. The output voltage from the device 22 is regulated so that the mean value will be substantially equal to zero.

Figure 4:
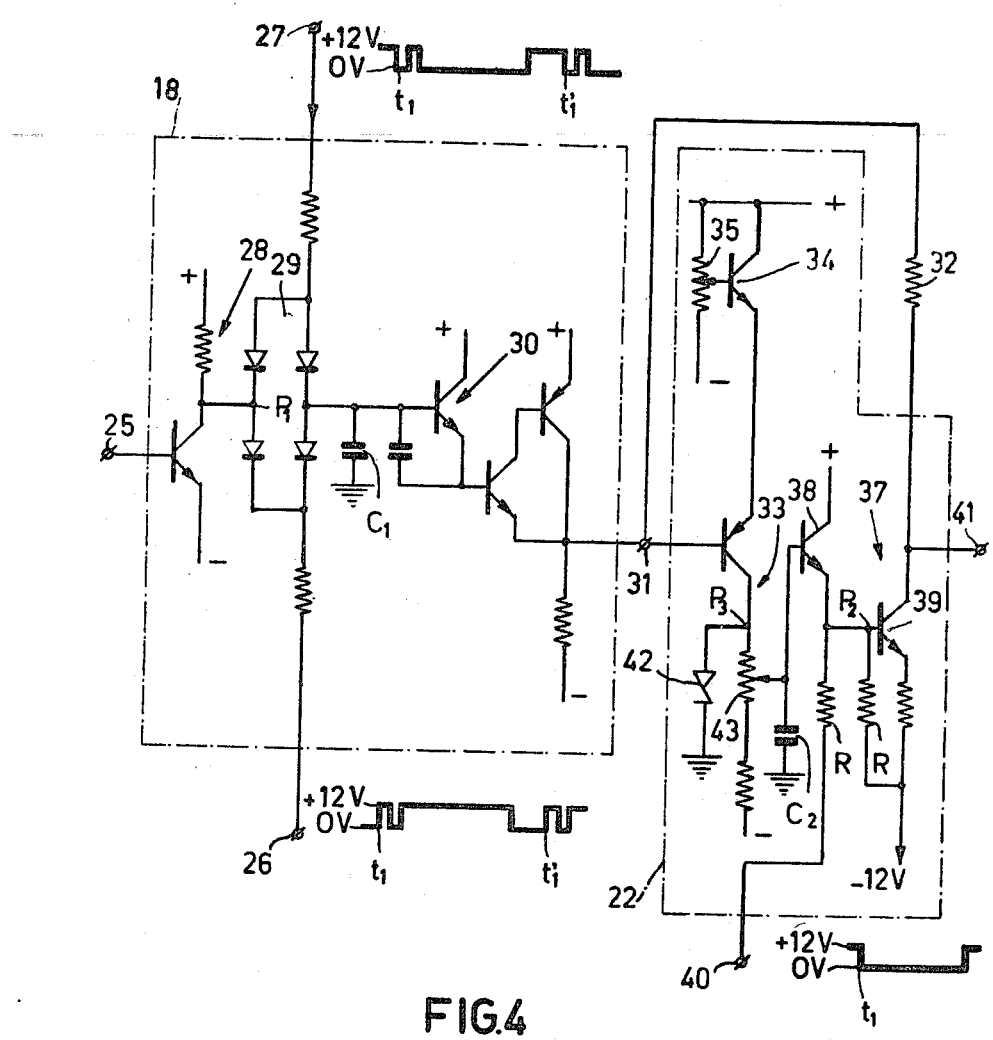
FIG. 4 is a circuit diagram of a section of the AFR unit in the device according to FIG. 1.
Figure 5:
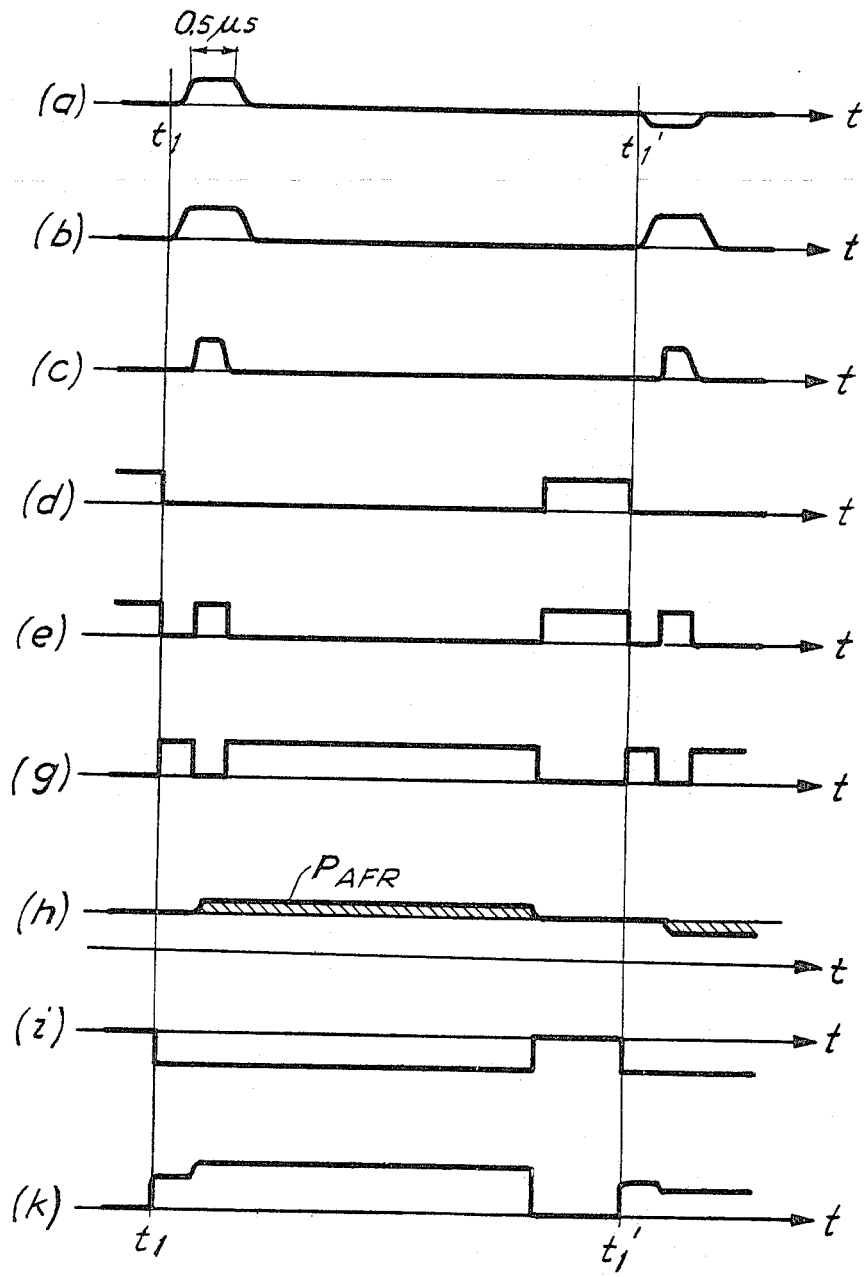
FIG. 5 is a diagram illustrating the variation of voltage with time at some different points of the AFR unit according to FIGS. 1 and 4.

The function of the AFR unit will now be described in detail with reference to the voltage diagrams shown in FIG. 5 and the circuit diagram for a part of the AFR unit shown in FIG. 4. The first Diagram ($a$) in FIG. 5 shows the voltage pulses derived from the frequency discriminator 17 and applied to the locking circuit 18, these pulses indicating by their amplitude and polarity the deviation of the measured frequency difference from the required intermediate frequency. The Diagram ($b$) shows the pulses from the discriminator 17 which are applied to the device 19. These pulses are converted in the device 19 to the gate pulses shown in Diagram $5(c)$. Diagram $5(d)$ shows the inverted output voltage from the echo time monostable circuit 11, which is applied to the devices 20 and 22. Diagram $5(e)$ shows the voltage produced by the adding device 20 by combining the gate pulse shown in Diagram $5(c)$ and the inverted output voltage from the echo time monostable circuit according to Diagram $5(d)$. The Diagram $5(g)$ shows the corresponding inverted voltage, which is also produced by the device 20. These voltages produced by the device 20 shown in Diagrams $5(e)$ and $(g)$ are applied to control terminals 26 and 27, respectively, of the locking circuit 18 (see FIG. 4). The discriminator pulse shown in FIG. $5(a)$ is also applied to a locking circuit. This pulse is received at an input terminal 25. The locking circuit consists according to FIG. 4 of an amplification stage 28, a diode gate 29, a locking capacitor $C_1$ and an impedance converting stage 30. The voltage appearing at the output terminal 31 of the locking circuit is shown by the Diagram $5(h)$. The circuit operates as follows:

Before the triggering moment, i.e. before the moment $t_1$, all diodes in gate 29 are fully conducting and the locking circuit delivers a constant rest voltage at its output terminal 31, which with the chosen supply voltages amounts to about 5.5 v. at the triggering moment $t_1$ the supply voltages to the diode gate are suddenly inverted so that all diodes in the same are cut off. The capacitor $C_1$ therefore maintains its voltage and the locking circuit will still produce the said rest voltage of about 5.5 v. at its output until the control voltages to the gate are again inverted due to the appearance of the said gate pulse, whereby the diodes in the gate 29 are again made fully conducting. According to the preceding description, the gate pulse appears in time coincidence with the center portion of the discriminator pulse, and when gate 29 is opened by the gate pulse there is consequently an input voltage present at the terminal 25, corresponding to the center portion of the pulse from the discriminator. The input voltage at terminal 25 causes a change of the voltage of point $P_1$. Since the diodes in gate 29 are conductive the capacitor $C_1$ is rapidly charged to a new value corresponding to the amplitude of the incoming voltage at terminal 25. After the end of the gate pulse, but during the center portion of the discriminator pulse, the control voltages to the gate are again switched and the capacitor $C_1$ will thereafter maintain its voltage during the whole echo time interval.

The impedance converting stage 30 has a very high input impedance and thus prevents discharging of the capacitor $C_1$ so that the output voltage from the locking circuit 18 is constant during the echo time interval. After the end of the echo time interval the diodes in the gate 29 are again made fully conducting and the charge on capacitor $C_1$ rapidly changes to the rest value until new triggering occurs. The deviation of the output voltage of the locking circuit from the rest value forms the said AFR pulses which are designated $p_{AFR}$ in FIG. $5(h)$.

The output voltage from the locking circuit is applied on the one hand to a transistor amplification stage 33 included in the device 22, for charging a big capacitor $C_2$ and on the other hand directly to the output of device 22 by way of an adding resistance 32 which comprises the previously mentioned adding device 21 (FIG. 1). The transistor of the stage 33 is connected in series with a transistor 34 co-operating with a manually adjustable potentiometer 35 adapted to remove the rest voltage of 5.5 v. appearing at the terminal 31 from the stage 33. The capacitor $C_2$ has a large time constant and will therefore receive a voltage corresponding to the mean value of a number of the AFR pulses in the output voltage from the locking circuit. This voltage appearing across capacitor $C_2$ is applied to a final stage 37 including two transistors 38 and 39. The inverted voltage from the echo time flip-flop is also applied to stage 37. This voltage is applied to a control terminal 40. The output voltage from the device is derived from terminal 41 for application to the correction unit 23 and thence to the control unit 10 of the local oscillator.

The voltage at point $P_2$ is shown by the Diagram $(i)$ in FIG. 5 while the output from the final stage is shown by the diagram $(k)$ in FIG. 5.

In the interval before the triggering moment $t_1$ point $P_2$ has a voltage of approximately zero volt and the transistor 39 is bottomed. Rest potential appears at the output terminal 31 of the locking circuit, and the output voltage at terminal 41 is zero.

At the triggering moment $t_1$ the control voltage at the terminal 40 is stepwise decreased to zero volts, whereby a stepwise change will appear in the voltage of point $P_2$ to a value determined by the transistor 38, i.e. to a value determined by the charging condition of the capacitor $C_2$. The output voltage from the locking circuit 18 appearing at terminal 31, which is applied directly to the output terminal 41 through the adding resistor 32, is still at rest potential and the output voltage appearing at terminal 41 will therefore make a stepwise change at the triggering moment $t_1$ to a value determined by the charging condition of the capacitor $C_2$. Immediately after the transmission of the radar pulse the previously mentioned change in the output voltage from the locking circuit (=AFR pulse) occurs which is applied directly through adding resistor 32 to the output terminal 41 and is thus superimposed upon the previously attained voltage. Both voltages at terminal 31 and across capacitor $C_2$ are maintained during the echo time interval and the voltage of terminal 41 will therefore maintain its value during the echo time interval, as is shown by Diagram $(k)$ in FIG. 5. After the end of the echo time interval the voltage of terminal 40 returns to +12 v. and the transistor 39 is bottomed, whereby the output voltage of terminal 41 will return to zero at the end of the echo time interval.

The circuit comprising capacitor $C_2$ has a larger time constant, whereby the voltage across capacitor $C_2$ will be determined by a great number of previous measurements. The charge on the capacitor is then varied in dependence of these foregoing measurements such that the voltage steps caused by the same give rise to such a correction of the local oscillator frequency that the difference between the local oscillator frequency and the frequency of the radar pulse in the transmission moment as measured over a great number of pulses, for example hundred pulses, will have an average equal to the required intermediate frequency. Due to the large time constant of capacitor $C_2$ the regulation will take place in a closed loop regulation circuit, in which the error voltage that is regulated to zero, is the mean value of a great number of AFR pulses from the locking circuit. Between the capacitor $C_2$ and the output of the locking circuit there is an essential amplification so that required regulation voltage can be produced across the capacitor $C_2$ with the mean value substantially equal to zero. The correction of the local oscillator frequency occurring after the transmission moment is on the contrary in an open regulation circuit because this correction occurs after the transmission moment and the measuring result are "forgotten" from pulse-to-pulse due to the fact that the capacitor $C_1$ is discharged for each pulse. By the described arrangement the said last frequency regulations are held at a minimum.

In order to ensure that the capacitor $C_2$ is given a suitable initial charge at the starting of the equipment when there exists no preceding measurements for determining the charge of the capacitor $C_2$, the emitter of the transistor included in the amplification stage 33 is connected to ground through a zener diode 42 and furthermore the voltage from the amplification stage 33 is applied to the capacitor $C_2$ by way of a potentiometer 43. Due to the zener diode 42 the voltage of point $P_3$ will be no greater than zero volts because the zener diode 42 is connected with its conduction direction from point $P_3$ to earth. Suitable setting of the potentiometer 43 therefore insures a minimum negative voltage across the capacitor $C_2$. When the voltage of point $P_3$ decreases beyond a determined value, for example 3.5 v., a breakdown occurs in the zener diode and the voltage of point $P_3$ is limited to this value. By this means a lower limit of the voltage across capacitor $C_2$ is also ensured. The two limit voltages of capacitor $C_2$ are so chosen that the corresponding frequency regulatoin of the local oscillator at the beginning of the echo time interval, i.e. at the triggering moment, results in such a frequency of the local oscillator that the measured frequency difference between the local oscillator and the radar pulse in the transmission moment certainly will fall within the working range of the frequency discriminator. After reaching the said working range the charging of the capacitor $C_2$ will thereafter be varied slowly in dependence upon the measured frequency differences until the described condition has been achieved.

The invention is not limited to use in combination with a radar equipment of the above-described kind in which the local oscillator is slaved to the magnetron before the triggering moment and the said triggering is effected by means of an external triggering pulse, but can also with advantage be used for example in such radar equipment in which triggering is effected by coincidence between the varying tuning frequency of the transmitter tube and the frequency of the local oscillator which also can be varied until the triggering moment.

What is claimed is:

1. A radar system comprising a transmitter and a receiver, said transmitter comprising means for sequentially transmitting pulses of high-frequency energy of varying frequency, said receiver comprising means for receiving echo signals, local oscillator means including voltage responsive means for varying the frequency of oscillation of said oscillator means, mixer means, means applying said echo signals and the output of said oscillator means to said mixer means for producing an intermediate frequency signal, means for producing a first control voltage responsive to the instantaneous difference between the frequency of said oscillations and the frequency of said pulses upon the occurrence of each pulse, means for applying said first control voltage to said voltage responsive means, whereby the frequency of said oscillations is adjusted to produce intermediate frequency signals of substantially constant frequency, means for producing a second control voltage responsive to the average difference between said local oscillator frequency and the frequency of said pulses, means applying said second control voltage to said voltage responsive means for preadjusting the frequency of said local oscillator means before said second control voltage is applied to said voltage responsive means, whereby the average of the frequency adjustment of said local oscillator means by said first control voltage is zero, and means for maintaining the amplitude of said first and second control voltages for a predetermined time following each pulse.

2. A radar system comprising a transmitter and a receiver, said transmitter comprising a tunable source of oscillations having excited and unexcited frequencies, means for continuously tuning said source, and means for triggering said source whereby said source transmits sequential pulses of high-frequency energy with the frequency of said energy continuously varying, said receiver comprising means for receiving echo signals, local oscillator means including voltage responsive means for varying the frequency of oscillations of said oscillator means, mixer means, means applying said echo signals and oscillations to said mixer means to produce an intermediate frequency signal, means for producing a following control voltage responsive to the unexcited frequency of said source, means applying said following control voltage to said voltage responsive means whereby the frequency of said oscillations is the same as said unexcited frequency at least at the instant of triggering of said source, means for producing a first control voltage responsive to the difference between the frequency of said oscillations and the instantaneous frequency of each pulse, means applying said first control voltage to said voltage responsive means whereby the frequency of said local oscillations is adjusted to provide a predetermined frequency difference between the frequency of said local oscillations and the frequency of said pulses upon the occurrence of each pulse, means for producing a second control voltage responsive to the mean difference between said local oscillator frequency and the frequency of said pulses for a substantial number of pulses, means for applying said second control voltage to said voltage sensitive means at the triggering instant of each pulse for preadjusting said oscillator frequency, and means for holding said first and second voltages constant for a predetermined time following each occurrence of a pulse.

3. A radar system comprising a transmitter and a receiver, said transmitter comprising a tunable source of oscillations having excited and unexcited frequencies, means for continuously tuning said source, and means for triggering said source whereby said source transmits sequential pulses of high-frequency energy with the frequency of said energy continuously varying, said receiver comprising means for receiving echo signals, local oscillator means including voltage responsive means for varying the frequency of oscillations of said oscillator means, mixer means, means applying said echo signals and oscillations to said mixer means to produce an intermediate frequency signal, means for producing a following control voltage responsive to the unexcited frequency of said source, means applying said following control voltage to said voltage responsive means whereby the frequency of said oscillations is the same as said unexcited frequency at least at the instant of triggering of said source, means responsive means for adjusting the local oscillator frequency and the frequency of each pulse, means for maintaining said deviation pulse for a predetermined time following each transmitter pulse, means for applying said deviation pulse to said voltage responsive means for adjusting the local oscillator frequency to produce a predetermined intermediate frequency, and means for preadjusting said local oscillator frequency before the occurrence of each transmitter pulse comprising filter means having a large time constant, means for applying said deviation pulses to said filter means to produce an output voltage representing the mean value of a substantial number of preceding deviation pulses, and means for applying said output voltage to said voltage responsive means from a time before the application thereto of said deviation pulses until said predetermined time following each transmitter pulse, whereby said mean value is regulated substantially to zero.

4. The system of claim 3 in which said filter means comprises a capacitor, means for charging said capacitor to an amplitude substantially proportional to the mean value of preceding deviation pulses, and means for deriving said output voltage from said capacitor.

5. The system of claim 3 comprising means for limiting the amplitude range of said output voltage.

6. Means for adjusting the local oscillator frequency in a radar system of the type in which a radar transmitter transmits sequential pulses of high-frequency energy of continuously varying frequency, and in which a receiver associated with said transmitter comprises a local oscillator having voltage responsive tuning means for producing oscillations for mixing with received echo signals in order to produce an intermediate frequency signal, said means for adjusting said local oscillator frequency comprising means responsive to each of said transmitted pulses for producing a deviation pulse having an amplitude and polarity dependent upon the frequency of the transmitted pulse and the local oscilator frequency, means for holding said deviation pulse at a constant amplitude for a predetermined time following each transmitted pulse, means for applying said deviation pulse to said voltage responsive means, whereby the frequency of said intermediate frequency signal is substantially constant at a predetermined frequency during the occurrence of said deviation pulse, and means for preadjusting said local oscillator frequency prior to the occurrence of each deviation pulse whereby the mean value of said deviation pulses is substantially zero, said means for preadjusting comprising filter means having a long time constant, means for applying said deviation pulses to said filter means for producing an output voltage corresponding to the mean value of a substantial number of preceding deviation pulses, and means for applying said output voltage to said voltage responsive means.

References Cited by the Examiner
UNITED STATES PATENTS 3,163,862   12/1964   Jenny _____ 343—14

CHESTER L. JUSTUS, *Primary Examiner.*

RODNEY D. BENNETT, *Assistant Examiner.*

UNITED STATES PATENT OFFICE
CERTIFICATE OF CORRECTION

Patent No. 3,290,678                                December 6, 1966

Nils Rune Carlsson

It is hereby certified that error appears in the above numbered patent requiring correction and that the said Letters Patent should read as corrected below.

Column 1, line 52, for "resutl" read -- result --; column 3, line 51, for "oscilator" read -- oscillator --; column 6, line 65, for "larger" read -- large --; column 7, line 36, for "regulatoin" read -- regulation --; column 8, line 64, for "responsive means for adjusting the local oscillator fre-" read -- responsive to each occurrence of a transmitter pulse for --; column 8, line 66, for "instaneous" read -- instantaneous --.

Signed and sealed this 19th day of September 1967.

(SEAL)
Attest:

ERNEST W. SWIDER                            EDWARD J. BRENNER
Attesting Officer                         Commissioner of Patents